United States Patent [19]

Marsch et al.

[11] 4,401,153
[45] Aug. 30, 1983

[54] HEAT EXCHANGER INCORPORATING NITRIDING-RESISTANT MATERIAL

[75] Inventors: Hans-Dieter Marsch; Hans-Günther Briecke, both of Dortmund, Fed. Rep. of Germany

[73] Assignee: Uhde GmbH, Dortmund, Fed. Rep. of Germany

[21] Appl. No.: 273,026

[22] Filed: Jun. 12, 1981

[30] Foreign Application Priority Data

Jun. 14, 1980 [DE] Fed. Rep. of Germany ....... 3022480

[51] Int. Cl.³ ........................ F28F 19/00; F28F 9/02
[52] U.S. Cl. ................................ 165/134 R; 428/36; 29/157.4; 165/133; 165/180; 165/158
[58] Field of Search ............... 165/134, 180, 133, 158; 29/157.4; 428/36

[56] References Cited

U.S. PATENT DOCUMENTS

| | | | |
|---|---|---|---|
| 3,317,222 | 5/1967 | Maretzo | 29/157.4 |
| 3,704,690 | 12/1972 | Mevenkamp | 165/134 |
| 3,982,585 | 9/1976 | Gribsvad | 165/158 |
| 4,071,083 | 1/1978 | Droin | 29/157.4 |

Primary Examiner—Albert W. Davis, Jr.
Assistant Examiner—S. Gayle Dotson
Attorney, Agent, or Firm—Toren, McGeady and Stanger

[57] ABSTRACT

In a heat exchanger for heat transfer between ammonia converter effluent recycle gases and water, a plurality of U-shaped tubes have their inlet and outlet ends connected to a tubesheet which divides the interior of a shell into a pressure chamber and a heat exchange chamber containing the tubes. The pressure chamber is divided into an inlet chamber and an outlet chamber with the cooled recycle gases flowing into the outlet chamber and cooling the inlet chamber. The tubes are formed of ferritic steel and are welded to the tubesheet. A tubular cladding of nitriding-resistant material extends through the tubesheet at the inlets to the tubes and spaces the recycle gases from the tubes at the inlet ends.

11 Claims, 5 Drawing Figures

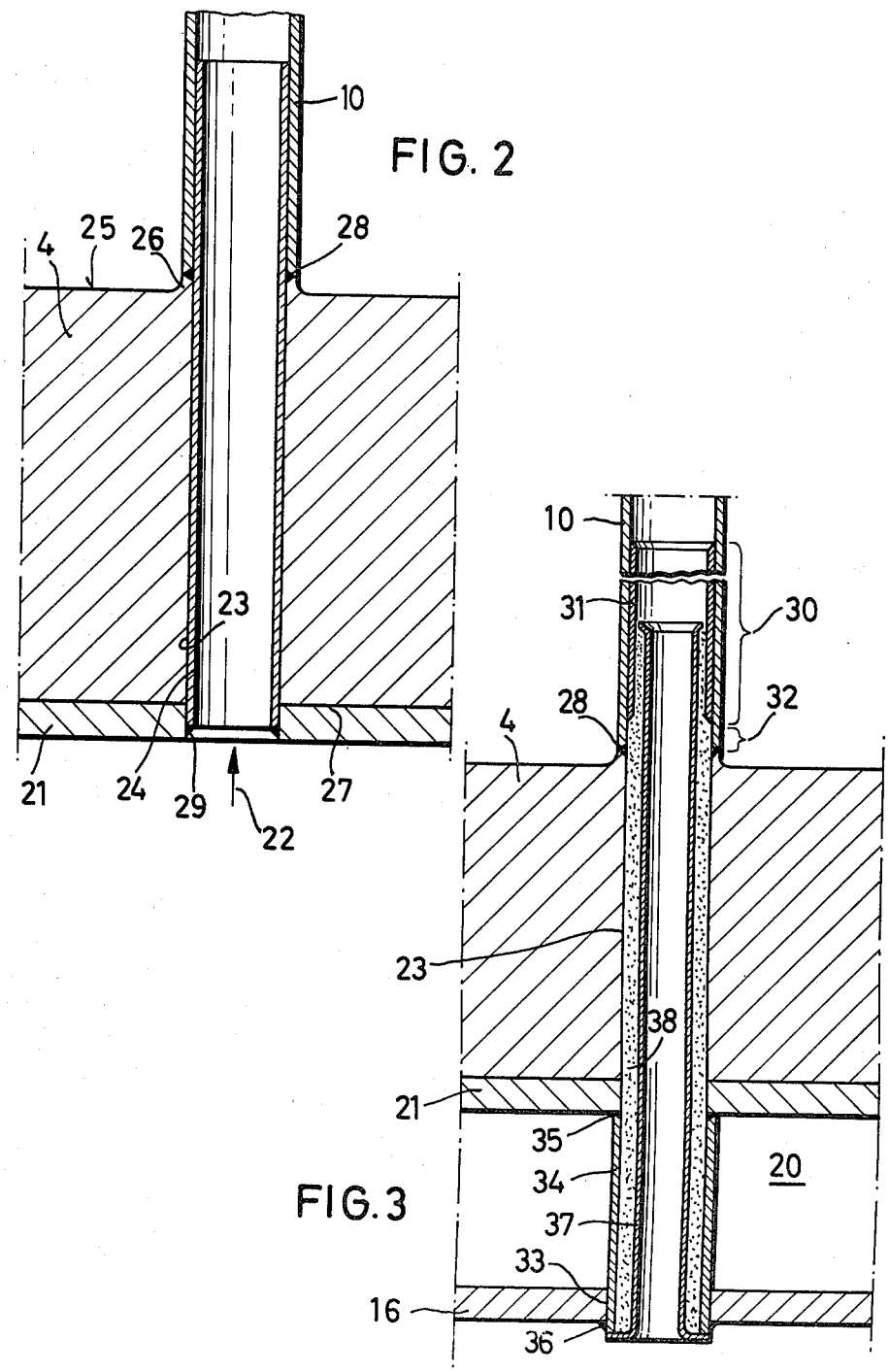

4,401,153

HEAT EXCHANGER INCORPORATING NITRIDING-RESISTANT MATERIAL

SUMMARY OF THE INVENTION

The present invention is directed to a heat exchanger for transferring heat between ammonia converter effluent gas and water. The heat exchanger is of the shell and tube type with the tubes being welded to a clad tubesheet which divides the interior of the shell into a pressure chamber and a heat exchange chamber. The pressure chamber is divided into an inlet chamber and an outlet chamber with the recycle gas flowing over the inlet chamber after it passes through the tubes.

To raise the efficiency of heat exchangers, particularly for the improved recovery of process heat, efforts have been made to perform the heat exchange at a high inlet temperature of the heat carrying fluid. In the ammonia synthesis process, it has been attempted to operate at a temperature as near as possible to the operating temperature of the reactor and this can be achieved by omitting any heat exchange inside the reactor so that a temperature of about 480° C. can be obtained at the heat exchanger inlet. Hot gases containing nitrogen and/or nitrogen compounds place certain requirements upon the heat exchanger because of the prevailing operating pressure levels. In the West German patent No. 20 07 528, a heat exchanger of the above type is disclosed and contains a tube sheet having a nitriding-resistant cladding with the cladding including steel with 32% Ni and 20% Cr, and the heat exchanger tubes being expanded into the tubesheet. The heat exchanger steel tubes are welded to the tubesheet cladding.

Although the heat exchanger steel tubes have a good resistance to nitriding with its consequent formation of cracks and scaling, there is the inherent disadvantage that they impose stringent requirement regarding the quality of the water to be vaporized in order to avoid damage by stress corrosion cracking. A supply of high quality water cannot always be assured and it is also expensive as is the use of heat exchanger tube materials resistant to nitriding.

Therefore, it is the primary object of the present invention to provide a heat exchanger with the surfaces exposed to hot gas being adequately protected against inadmissible nitriding while the surfaces wetted by water are adequately protected against corrosion.

In accordance with the present invention, the heat exchanger tubes are formed of ferritic steel and are welded to the tube sheet and a tubular cladding of nitriding-resistant materials is provided within each hole in the tubesheet conveying hot gases so that the cladding spaces the hot gases from the tubes.

With such an arrangement the risk of the nitriding phenomena occurring at the hot gas inlet ends of the heat exchanger tube or in the holes of a heavy-wall tubesheet securing the tubes while using tubes of ferritic steel, as normally used in boiler construction, eliminates the risk of corrosion at an economically justified expenditure.

It has been known to secure heat exchanger tubes to the heat exchange side of thin-wall tubesheets by internal bore welding, however, this method has not as yet been practiced on heavy-wall tubesheets.

In one embodiment of the invention a protective sleeve of nitriding-resistant material is inserted into the tubesheet hole with the outside diameter of the sleeve being smaller than the diameter of the tubesheet hole. As a result, an annular space is formed between the surface of the tubesheet hole and the protective sleeve and the space is filled with thermal insulation. In a heat exchanger as described above, this arrangement results in a more uniform temperature distribution across a heavy-wall tubesheet.

Another feature of the use of the protective sleeve and insulation is to extend them into the heat exchanger tubes, that is, the length of the sleeve is greater than the tubesheet thickness so that the insulation effect extends into the heat exchanger tube beyond the point at which it is joined to the tubesheet.

In another embodiment of the present invention, a compound tube with a nitriding-resistant cladding is provided between the heat exchange chamber side of the tubesheet and the ferritic heat exchanger tubes and the protective sleeve with thermal insulation extends into this compound tube.

Compound tubes formed of different materials are known. Use of such tubes has always been a problem because one layer of the tube had to be joined to the thick ferritic part of the tubesheet and another layer to the nitriding-resistant cladding of the tubesheet and this requirement is completely avoided by this embodiment of the present invention.

To obtain a ferritic bond between a compound tube and the tubesheet, in an expedient embodiment of the present invention the cladding of the compound tube is removed in the region of the joint between the tube and the tubesheet with this region being covered by thermal insulation while the heat exchanger is in operation. Therefore, the welded joint between the tubesheet and the heat exchange tubes includes the same materials so that welding problems are avoided.

In still another embodiment of the present invention, the heat exchanger tubes can be formed as compound tubes with the length of such compound tubes extending into a point of subcritical wall temperature with regard the risk of nitriding. This subcritical temperature is about 350° C.

To avoid damage to the heavy-wall tubesheet by strong temperature variations caused especially by alternating load and to achieve a more uniform temperature distribution in the axial and radial direction within the tubesheet which is exposed to the water temperature on the heat exchange chamber side, an essential embodiment of the present invention involves the division of the pressure chamber side of the tubesheet into a cooled gas outlet chamber enclosing a hot gas inlet chamber so that the inlet chamber is cooled. The inlet ends of the heat exchanger tubes extend from the tubesheet and are welded to a wall forming part of the inlet chamber so that the cooled outlet gases flow over the inlet ends of the tubes. The cooled gas outlet member directs a part of the cooled recycled gas over the hot or pressure chamber side of the tubesheet so that this side is kept at approximately the same temperature as the heat exchanger side. This arrangement yields a more uniform temperature distribution within the tubesheet so that alternating loads are easily neutralized without thermal stresses resulting from temperature variations.

In a further embodiment of the present invention the tubesheet hole and the corresponding holes in the wall of the inlet chamber are connected at a tubular sleeve having a nitriding-resistant cladding. It is also possible to provide a nitriding-resistant cladding in the form of a protective sleeve of nitriding-resistant material with the protective sleeve having a smaller outside diameter than the tubular sleeve so that an annular space is formed between them and is filled with insulation. It is preferable that the protective sleeve and the insulation extend from the wall of the inlet chamber into the corresponding heat exchanger tube.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is an enlarged cross-sectional view of a portion of a heat exchanger embodying the present invention and illustrating the region of the tubesheet;

FIG. 3 is another enlarged cross-sectional view showing another embodiment of the present invention with an inlet chamber spaced upstream from the tubesheet.

DETAILED DESCRIPTION OF THE INVENTION

Figure 1:
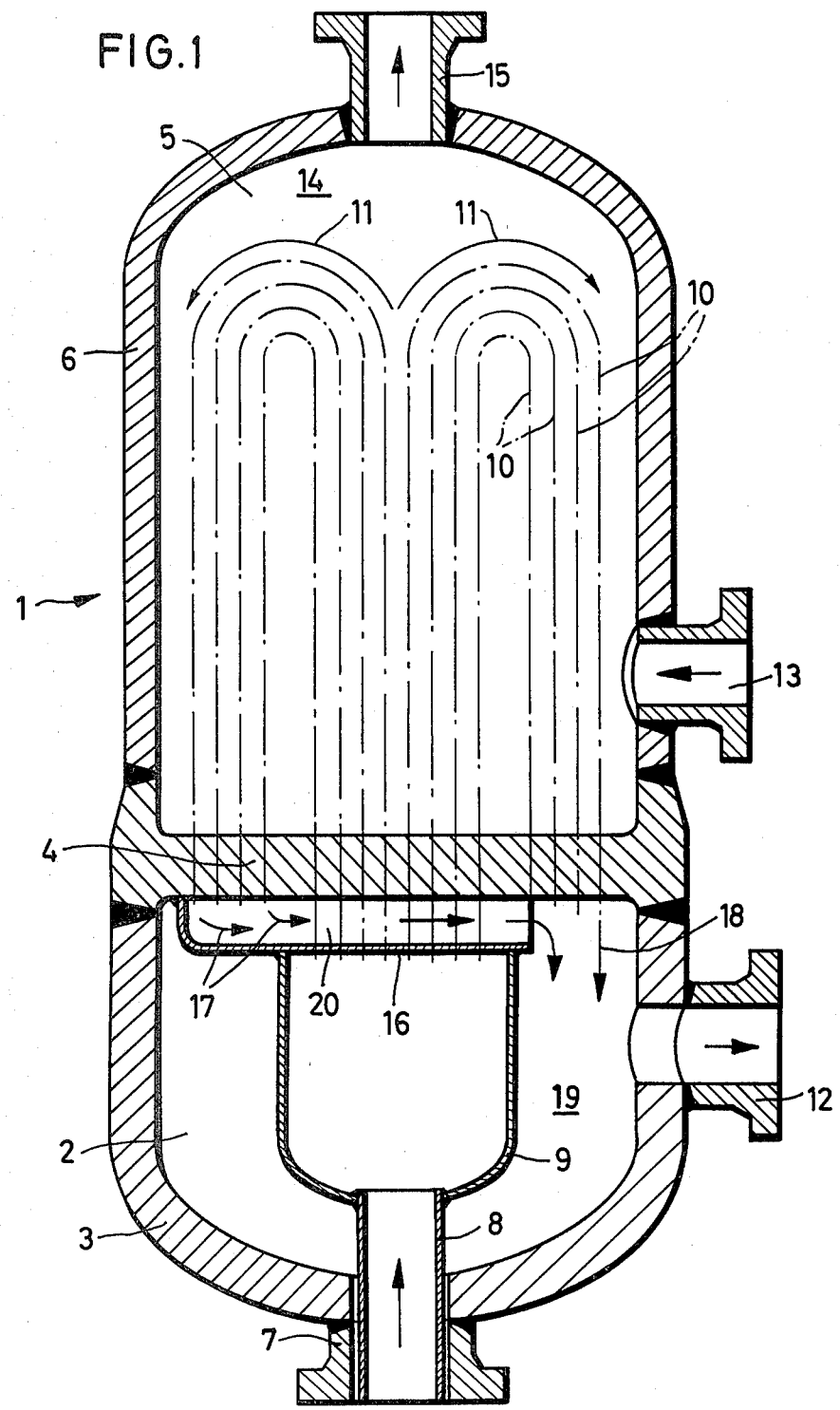
FIG. 1 is a schematic cross-sectional view of a heat exchanger embodying the present invention.

In FIG. 1 a shell and tube heat exchanger 1 is shown including a casing formed by a pressure-resistant wall 3 and a heat exchanger wall 6 with the interior of the shell divided by a tubesheet 4 into a high pressure chamber 2 and a heat exchanger chamber 5. As can be seen in FIG. 1, the walls defining the two chambers and forming the casing are welded to the tubesheet 4.

A pressure-bearing inlet nozzle 7 is secured to the pressure chamber wall 3 for the inflow of hot recycle gas (the gas is at a temperature of 420° to 500° C. and at a pressure of 150 to 320 bar at this location) and a wall part 8 extends through the nozzle 7 forming a connection to another wall part 9 forming a bell-shaped inlet chamber for introducing the hot recycle gas to the inlet ends of heat exchanger tubes 10. As indicated schematically, the heat exchanger tubes are U-shaped with the inlet ends centrally located in the tubesheet 4 and the outlet ends extending around a circular region about the inlet ends. Arrows 11 indicate the flow path of the hot recycle gases through the heat exchanger tubes 10 so that the gases flow initially in the upward direction as viewed in FIG. 1 to the U-bends and then reverse direction flowing back toward the tubesheet with the cooled recycle gas flowing from the tubes into an outlet chamber extending around the inlet chamber. The cooled recycle gas leaves the outlet chamber 19 by way of a gas outlet nozzle 12 welded to the wall 3.

Water or boiler feed water to be vaporized is introduced through inlet nozzle 13 into the heat exchanger chamber 5 where it is vaporized as it flows over the outside surface of the heat exchanger tubes 10. Steam generated within the heat exchanger chamber flows upwardly into the space 14 in the chamber 5 and then out through nozzle 15.

As can be seen in FIG. 1, the hot recycle gas does not flow directly from the inlet chamber defined by the wall 9 to the tubesheet, rather the inlet ends of the tubes project downwardly through the tubesheet and are secured within inlet chamber wall 16. In combination with the tubesheet 4, the inlet chamber wall 16 forms a passageway for a certain portion of the cooled recycle gases flowing out of the tubes 10 so that the recycle gas flows over the tubesheet 4 as indicated by arrows 17. This partial flow of the cooled gas enters the outlet chamber space 19 where it mixes with the remaining flow of the cooled recycled gas, note arrow 18. The space 19 is located between the pressure-resistant wall 3 and the wall 9 forming the inlet chamber. To improve mixing and to achieve a more uniform flow in the space 19, guide vanes or other guide elements, not shown, may be provided. The wall 9 and the wall 16 forming the inlet chamber and the guide chamber 20 are formed of nitride-resisting material and are provided with a corresponding cladding at least on the hot sides of the walls.

In FIG. 2, tube sheet 4 is provided with a nitriding-resistant cladding 21 on the "hotside", that is, the pressure chamber side. The inflow of hot recycle gas is indicated by arrow 22. Each tubesheet hole 23 is provided with a tubular sleeve cladding 24 of nitriding-resistant material.

Further, the heat exchange chamber side 25 of the tubesheet 4 has an annular ring 26 projecting outwardly from the tubesheet at the tubesheet hole 23 and forming a welding connection for the heat exchange tube 10. The heat exchange tube 10 is connected by a ferritic weld to the annular ring 26 with the weld being effected from the opposite side 27 of the tubesheet. This method of welding is generally known as "internal bore welding". The term "ferritic weld" is intended to indicate that the materials in the tubesheet 4 and the heat exchange tube 10 joined by weld 28 are identical from the welding technique standpoint.

The tubular cladding 24 of nitriding-resistant material extends beyond the heat exchanger chamber side of the tubesheet 4 into the heat exchanger tube 10 so that it covers the region of the ferritic weld 28. Further, at the pressure chamber side of the tubesheet 4, the tubular cladding 24 is joined to the cladding 21 by a weld 29 so that the recycle gas cannot come in contact with the wall surface of the tubesheet hole 23.

In FIG. 3 a modified embodiment of the invention is shown with an outlet guide chamber 20 located on the "hot side" or pressure chamber side of tubesheet 4.

In FIG. 3 a portion of heat exchanger tube 10 is a compound tube 30 as indicated by the brace or bracket. The compound tube 30 is located on the heat exchanger chamber side of the tubesheet 4. The length of the compound tube 30 depends on the operating conditions of the specific heat exchanger and is determined to ensure that the inside surface temperature of the heat exchanger tube is subcritical at the end of the compound tube section. The compound tube section 30 includes the heat exchanger tube and a length of nitride-resistant cladding 31. The heat exchanger tube 10 is connected to an annular ring formed around the tubesheet hole by an interior weld 28. The nitriding-resistant cladding 31 does not extend over the weld 28, that is, it is spaced from the weld by the dimension indicated by the small bracket or brace 32.

As can be seen in FIG. 3, inlet chamber wall 16 is provided with a hole 33 aligned with the tubesheet hole 23 and a tubular sleeve 34 extends through the hole 33 to the adjacent face of the cladding 21 on the pressure chamber side of the tubesheet 4. Weld 35 attaches the sleeve 34 to the cladding 21 and another weld 36 secures the sleeve 34 to the face of the wall 16 within the inlet chamber. Spaced inwardly from the tubular sleeve 34 and also from the inside surface of the tubesheet hole 23 is a protective sleeve 37 of nitriding-resistant material which is secured to the lower end of the sleeve 34 by expanding or welding, not shown. Protective sleeve 37 extends through the tubular sleeve 34 and through the hole 23 in the tubesheet 4 and extends upwardly into the region of the compound tube 30 with the weld 28 and the region designated by the bracket 32 free of the cladding 31 of the compound tube 30 being covered as shown in FIG. 3. The outside diameter of the sleeve 37 is smaller than the inside diameter of tubesheet hole 23 and of tubular sleeve 34 thereby providing an annular space therebetween. The annular space is filled with insulation 38 from the wall 16 of the inlet chamber through the tubesheet to the upper end of the protective sleeve 37 and prevents any heat transfer from the protective sleeve 37 outwardly.

Figure 4:
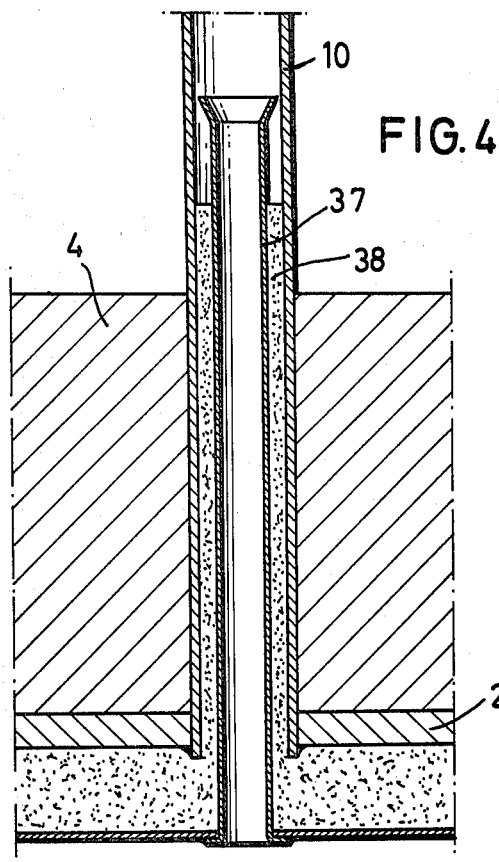
FIGS. 4 and 5 are enlarged cross-sectional views illustrating further embodiments of the present invention.
Figure 5:
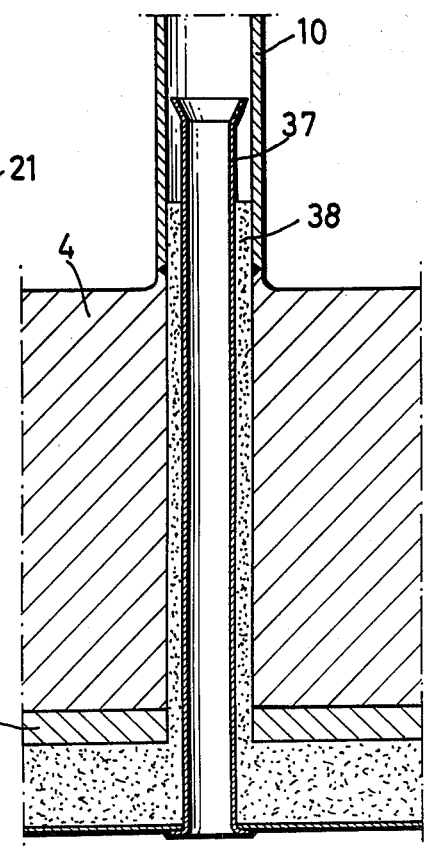

In FIGS. 4 and 5 other embodiments of the present invention are illustrated with similar components designated by the same reference numerals as above. In FIG. 4, however, the heat exchange tube 10 extends through the tubesheet 4 and is welded to the cladding 21 on the pressure chamber side of the tubesheet. Protective sleeve 37 extends through the tubesheet from the pressure chamber side and terminates a short distance beyond the heat exchange chamber side of the tubesheet. The sleeve 37 is spaced inwardly from the inside surface of the heat exchanger tube 10 and the space between them is filled with insulation 38.

In FIG. 5 as in FIGS. 2 and 3, the heat exchanger tube 10 is welded to the annular ring around the hole 23 on the heat exchanger chamber side of the tubesheet 4.

The various embodiments of the invention described above and illustrated in the drawing can be modified in various ways without deviating from the basic concept of the invention. In particular, the invention is not limited to the use of specific construction materials such as specific grades of steel or specific insulating or cladding materials, nor is the invention limited to a defined routing of the process gas or the water.

While specific embodiments of the invention have been shown and described in detail to illustrate the application of the inventive principles, it will be understood that the invention may be embodied otherwise without departing from such principles.

We claim:

1. A heat exchanger for heat transfer such as between ammonia converter effluent recycle gas and water comprising a shell forming a closed space, a tubesheet secured within said shell and dividing the space therein into a pressure chamber on one side of said tubesheet and a heat exchange chamber on the other side of said tubesheet, a plurality of heat exchange tubes located within said heat exchange chamber and each of said tubes having an inlet end and an outlet end secured to said tubesheet for carrying a heat exchange medium through said heat exchange chamber, the inlet and outlet ends of said tubes are welded to said tubesheet and arranged to convey the heat exchange medium medium through said heat exchange chamber, wall means located within said pressure chamber and dividing said pressure chamber into an inlet chamber for flowing the heat exchange medium into the inlet ends of said tubes and an outlet chamber for receiving the cooled heat exchange medium from the outlet ends of said tubes with said outlet chamber at least partly enclosing said inlet chamber so that the cooled heat exchange medium cools said inlet chamber, said tubesheet having a pressure chamber side and a heat exchange chamber side and a plurality of tubesheet holes extending from the pressure chamber side to the heat exchange chamber side, said tubes are formed of ferritic steel, said tube sheet having the inlet end of said tube connected thereto for receiving the heat exchange medium from said inlet chamber, and a tubular cladding of nitriding-resistant material extending through said tubesheet holes into the inlet ends of said tubes from the pressure chamber side of said tubesheet to at least the heat exchange chamber side, said inlet chamber is spaced from the pressure chamber side of said tubesheet by a portion of said outlet chamber and said wall means forming said inlet chamber comprising a wall section spaced from said tubesheet and having holes therethrough aligned with said holes in said tubesheet.

2. A heat exchanger, as set forth in claim 1, wherein a tubular sleeve extends between one said tubesheet hole and the corresponding hole in said wall section of said inlet chamber.

3. A heat exchanger, as set forth in claim 1 or 2, wherein said heat exchange tubes are connected to the heat exchange chamber side of said tubesheet.

4. A heat exchanger, as set forth in claim 1 or 2, wherein said heat exchange tubes are connected to the pressure chamber side of said tubesheet.

5. A heat exchanger, as set forth in claim 3, wherein a protective sleeve of nitriding-resistant material is located within each of the tubesheet holes to which the inlet ends of said heat exchange tubes are connected.

6. A heat exchanger, as set forth in claim 5, wherein said protective sleeve extends from said tubesheet into said heat exchange chamber penetrating into said heat exchanger tube.

7. A heat exchanger, as set forth in claim 6, wherein each said heat exchanger tube includes a compound tube section having a nitriding-resistant cladding formed on the inside surface of said heat exchanger tube with said cladding located within said heat exchange chamber, and said protective sleeve extending into the region of said compound tube section.

8. A heat exchanger, as set forth in claim 7, wherein the end of said compound tube section is spaced from the connection of said heat exchanger tube to said tubesheet so that a ferritic bond is formed between said heat exchange tube and said tubesheet with the area of the weld connection of said heat exchange tube to said tubesheet covered by said thermal insulation.

9. A heat exchanger, as set forth in claim 7, wherein said compound tube sections of said heat exchange tubes extend in said heat exchanger tubes from the heat exchange chamber side of said tubesheet to the point of subcritical wall termperature within said heat exchanger tube with reference to the risk of nitriding.

10. A heat exchanger, as set forth in claim 1 or 2, wherein said tubular cladding of nitriding-resistant material comprises a protective sleeve of nitriding-resistant material, said protective sleeve having an outside diameter smaller than the inside diameter of said tubular sleeve and forming an annular space therebetween, and an insulation material filling the annular space between said protective sleeve and said tubular sleeve.

11. A heat exchanger, as set forth in claim 10, wherein said protective sleeve extends continuously from said wall section of said inlet chamber into said heat exchange tube on the heat exchange chamber side of said tubesheet.

* * * * *